United States Patent [19]
Witten et al.

[11] Patent Number: 4,697,767
[45] Date of Patent: Oct. 6, 1987

[54] SPACECRAFT SUBSYSTEM SUPPORT STRUCTURE

[75] Inventors: Mark A. Witten, St. Charles County; Robert B. Hotze, Kirkwood; Leonard E. Stephenson, Ferguson, all of Mo.

[73] Assignee: The United States of America as represented by the Secretary of the Air Force, Washington, D.C.

[21] Appl. No.: 867,652

[22] Filed: May 28, 1986

[51] Int. Cl.[4] ............................................. B64G 1/22
[52] U.S. Cl. ................................ 244/158 R; 244/161
[58] Field of Search .................... 244/158 R, 159, 160, 244/54, 161, 162

[56] References Cited

U.S. PATENT DOCUMENTS

| | | | |
|---|---|---|---|
| 1,816,129 | 7/1931 | Sikorsky. | |
| 2,539,960 | 1/1951 | Marchant et al. | 60/102 |
| 3,502,287 | 3/1970 | Lindsay | 244/54 |
| 4,016,022 | 4/1977 | Browning et al. | 156/285 |
| 4,259,821 | 4/1981 | Bush | 52/309.1 |
| 4,395,004 | 7/1983 | Ganssle et al. | 244/158 R |
| 4,397,434 | 8/1983 | Farnham | 244/158 R |
| 4,575,029 | 3/1986 | Harwood et al. | 244/158 R |

OTHER PUBLICATIONS

McCraft et al, "Use of Pallet-Type Structures in Shuttle Attached and Free Flying Modes", *Acta Astronautics*, vol. 7, 1980, pp. 1239–1258.
Koelle, "Reusable Satellite Platforms", *Spaceflight*, vol. 24, 3, Mar. 1982.

*Primary Examiner*—Galen Barefoot
*Attorney, Agent, or Firm*—Stanton E. Collier; Donald J. Singer

[57] ABSTRACT

A structural system is used to hold a laser communications subsystem having a gimballed telescope mounted on a truss system. Optical equipment requiring high tolerances is mounted onto an equipment support assembly that is mounted within the truss system for the gimballed telescope. This assembly is mounted by means of frame members and truss tubes.

7 Claims, 16 Drawing Figures

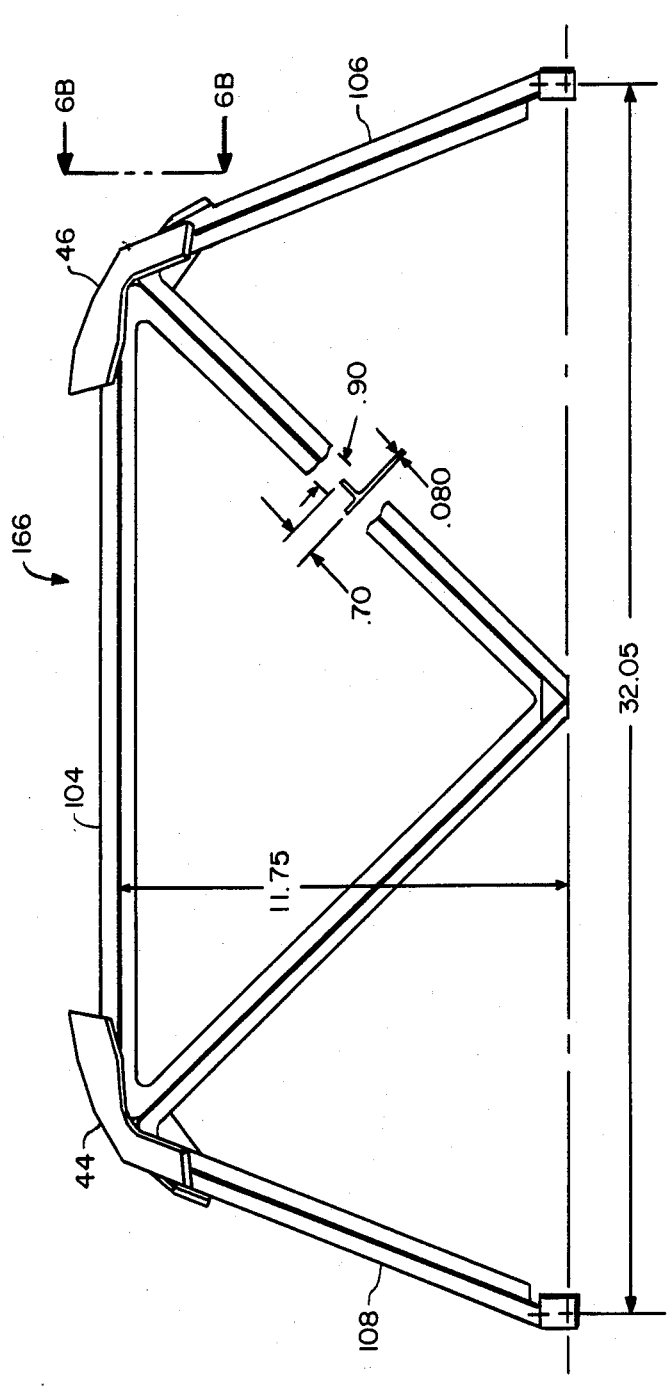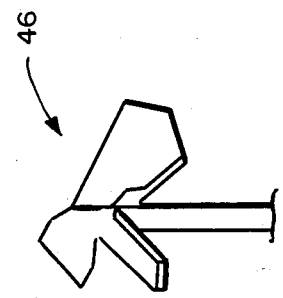
FIG. 6A
FIG. 6B

SPACECRAFT SUBSYSTEM SUPPORT STRUCTURE

STATEMENT OF GOVERNMENT INTEREST

The invention described herein may be manufactured and used by or for the Government for governmental purposes without the payment of any royalty thereon.

BACKGROUND OF THE INVENTION

This invention relates to spacecraft structures, and, in particular, relates to spacecraft structures used to hold multiple pieces of equipment in a rigid manner.

Primary considerations for such structural systems are (1) minimum weight, (2) highest possible structural rigidity, and (3) maximum thermal stability. A spaceborne structural system must also withstand the rigors of launch and orbital environments without exhibiting distortions due to launch loads, gravity release, or exposure to a vacuum environment. Such a high precision structural system must also be capable of maintaining the alignment of its components to within its requirements while experiencing the induced environment of the orbital platform (inertia wheels, reaction thrusters, etc.).

Past structural systems have utilized metal, composite, or honeycomb core materials to achieve light, rigid structures, but have had difficulty in maintaining stringent alignment criteria at the same time. Thermal stability is a major limiting factor on many materials. Some composites and a few metals exhibit acceptable thermal properties, but unless they are fabricated and assembled into a structural system that takes advantage of these properties, the resultant assembly does not meet its accuracy or stability requirements.

SUMMARY OF THE INVENTION

The present invention overcomes these past problems by providing a spacecraft structural system which is both structurally rigid and thermally stable.

The present invention is a structural system which can be used in various configurations to hold equipment in a rigid and thermally stable position onboard spacecraft. The typical application of this invention would be wherever an ultra-lightweight, highly stable spacecraft structure is needed, such as optical, laser, or high energy pointing/tracking systems.

This invention, in particular, discloses the Laser Crosslink System (LCS) on a spacecraft. The LCS is a laser communication subsystem package which is used in satellite communications. This subsystem package is mounted to a spacecraft at three points of a mounting system. The specific equipment contained within the subsystem is not pertinent to this invention since the structural system can be modified to accomodate a variety of equipment.

The structural system consists of tube trusses and frames joined by blade-type joints. The frame members support the internal equipment mounting and the truss tubes support the frames and distal equipment, as well as provide the load paths to the subsystem/spacecraft mounting interface. The frame provides traditional four bolt mounting provisions for electronic equipment and a strain free mounting for optical equipment.

Since dimensional stability, stiffness, and weight are the primary criteria used in the selection of materials for this structural system, high modulus graphite/epoxy (HMS/934) prepreg is used in the truss tubes. The laminate orientation selected provides a high modulus and near zero coefficient of thermal expansion in the axial direction.

The frames are also made with the high modulus graphite/epoxy materials, but are fabricated by using a special transfer mold process over a stylus woven and fabric fiber mat. This process allows the inclusion on the frame members of tabs and pads which share continuous fiber reinforcement with the main frame member.

All fittings are made from titanium. There are three LCS attachment fittings which connect the structural system to the spacecraft, three distal equipment mounting fittings to connect the Gimballed Telescope Assembly (GTA) to the structural system, four frame/truss fittings, and two fittings for a removable strut.

The three LCS attachment fittings provide statically determinate mounting to the spacecraft. The distal equipment (Gimballed Telescope Assembly) support truss tubes are attached to these attachment fittings, as are the frame truss tubes. Each LCS attachment fitting contains a threaded rod and fitting which allows installation adjustment of the structural system relative the the spacecraft.

Bonded joints are used throughout the structure to minimize inelastic deformations during launch and ascent. To avoid typical slippage, a special joint splice technique is used to attach the graphite/epoxy tubes to the frames and fittings.

It is therefore one object of the present invention to provide a truss tube structure where possible for axial load transfer in order to minimize weight and maximize stiffness.

It is therefore another object of the present invention to provide a structure that is attached in a statically determinate manner so as to prevent distortion between the structural system and the spacecraft.

It is therefore another object of the present invention to provide for a three point attachment adjustment to allow subsystem installation and alignment on the spacecraft without distortion between the components with the subsystem and the spacecraft.

It is therefore another object of the present invention to provide for a structural system having thermally stable high modulus materials therein.

It is therefore another object of the present invention to provide for a structure using specialized composite tube lay-up techniques, using a specialized frame transfer molding process, and using fiber reinforcement in the frame.

It is therefore another object of the present invention to provide for a frame having integral tabs and blades with continuous fiber reinforcement shared with the main frame members.

It is therefore another object of the present invention to provide for a bonding-in-place joint technique to eliminate shimming.

These and many other objects and advantages of the present invention will be readily apparent to one skilled in the pertinent art from the following detailed description of a preferred embodiment of the invention and the related drawings.

BRIEF DESCRIPTION OF THE DRAWINGS

FIGS. 6A and 6B are a top view (looking —Z) and a side view (looking —Y) of the backup frame.

DETAILED DESCRIPTION OF THE PREFERRED EMBODIMENT

The present invention, configured for the Laser Communication System (LCS), consists of a combination of tubular trusses and frames made in a unique process to obtain desired features. These members compose a structural system 10, FIGS. 1, 2, 3, and 4, in particular, which carries the subsystem package, i.e., load, in a manner wherein the primarily bending and shearing loads are placed on bending member, i.e., frame members, and the axial loads are placed in axial members, i.e., truss members. By thus matching the configuration to the specific load paths, a minimum weight structure can be produced.

For the LCS, there are three distinct structural requirements: (1) support a gimballed telescope assembly (GTA) 148, FIG. 1, remotely from the other equipment and support it relative to the other equipment such that the relative displacements between the GTA 148 and the other equipment are minimized for both launch/ascent and on-orbit operations; (2) support the internal equipment assemblies such that the optical equipment does not suffer distortions or misalignments such that an acceptable load/shock/vibration environment is maintained at each component mounting location; and (3) mount and support the LCS to the spacecraft, not shown, in such a way as to facilitate installation, transfer the LCS loads to the spacecraft, and not transfer distortions between the LCS and the spacecraft. The structural system 10 is shown in FIGS. 1, 2, 3 and 4 without external thermal protection.

Figure 1:
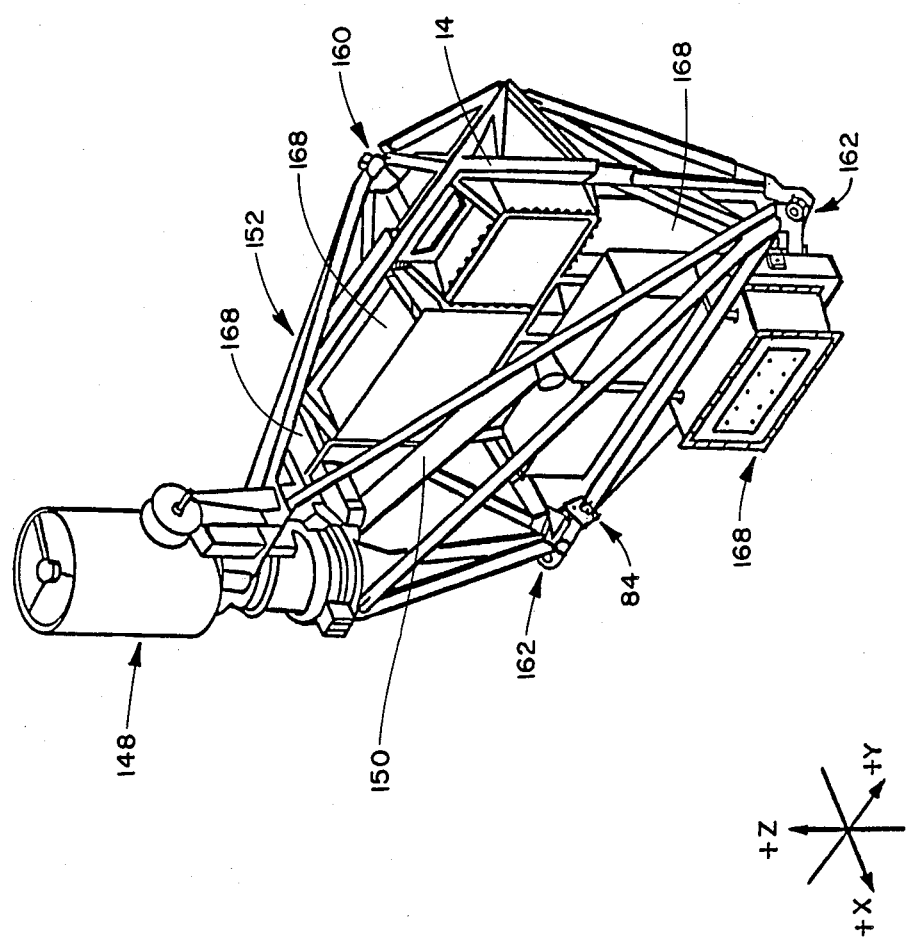
FIG. 1 is a pictorial representation of the Laser Crosslink System with external thermal systems removed for clarity.

The specific performance parameters for the LCS structural system 10 are as follows:

Structural weight: 18.4 lbs
Payload weight: 292.0 lbs
Alignment (under any combination of specification loads):

(1) less than 0.25 degrees angular displacement of the GTA 148 relative to the inboard optics;

(2) less than 1.0 mm displacement of an optical relay tube assembly (ORTA) 150, FIG. 1, normal to the tube axis;

(3) less than 5.0 mm displacement of the ORTA 150 along the tube axis;

(4) less than 500 microradians of angular displacement of the GTA 148 line of sight (during ground handling, transportation, launch, and ascent);

(5) less than 170 microradians of angular displacement of the GTA 148 line of sight on orbit;

(6) less than 50 microradians per hour angular rate of change of the GTA 148 line of sight during on-orbit operations.

The GTA 148 is supported by a truss system 152 of three pairs of truss tubes: 48, 50, 52, 54, 56 and 58. Truss system 152 further has base truss tubes 72, 74 and 84; tube 84 being removable. GTA 152 attaches to joints 16, 18 and 20 having upper GTA attach fittings 154 and 156 and a lower GTA attach fitting 158 therein illustrated in FIG. 10. Each truss tube 48, 50, 52, 54, 56 and 58 are attached to attach fittings 160, 162 and 164 at joints 30, 32, and 34 respectively. Fittings 160, 162 and 164 attach directly onto the spacecraft thus loads are transmitted directly to the spacecraft without distorting the remaining LCS structural system 10. Each of the fittings will be detailed in detail hereinbelow.

Figures 5A, 5B:
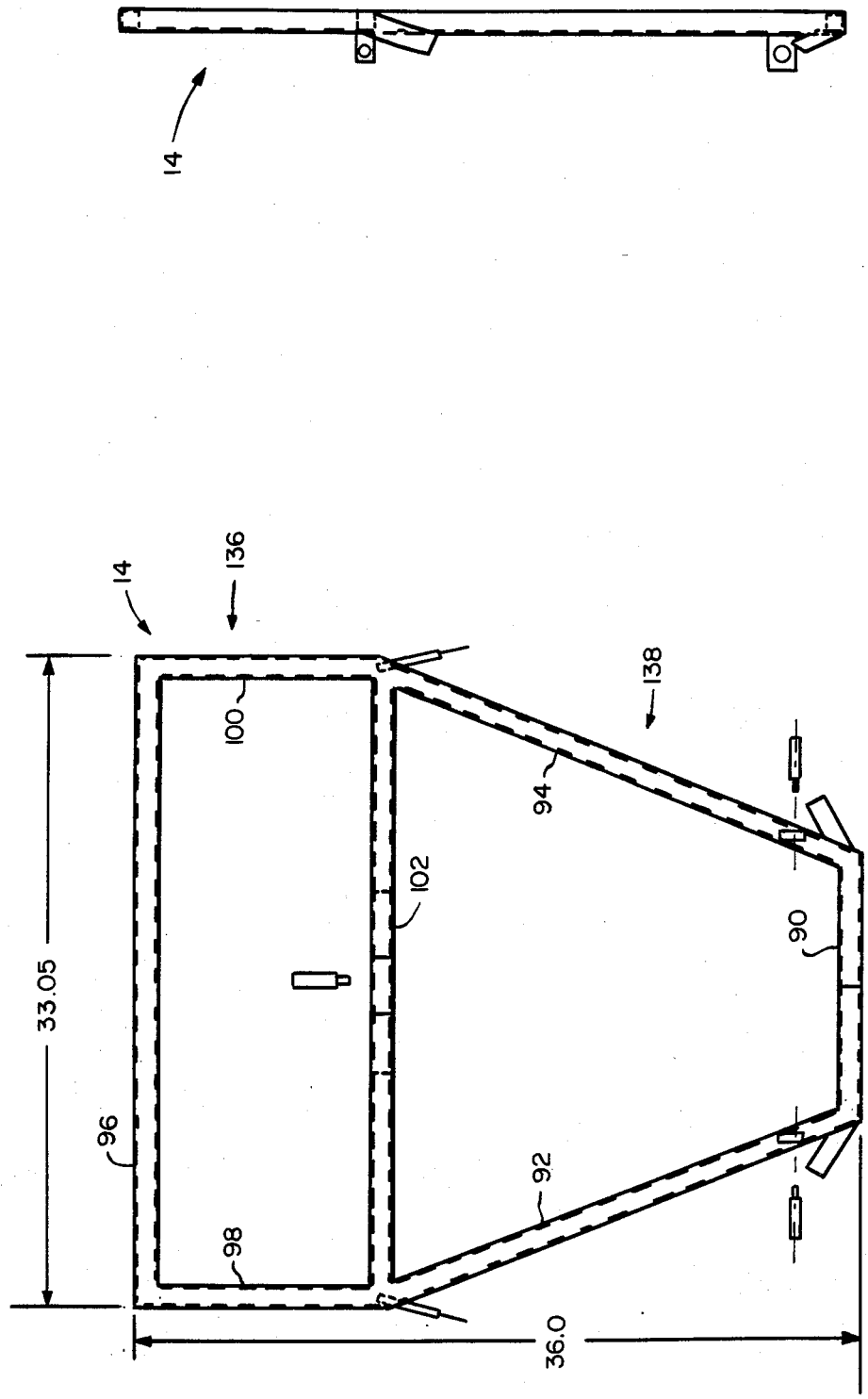
FIGS. 5A and 5B are a front view (looking —X) and side view (looking —Y) of the equipment support frame.

All of the remaining LCS equipment, FIG. 1, is supported by an equipment support frame 14. Frame 14 is depicted in FIG. 5 and supports both electronic and optical equipment. In FIG. 1, three electronic assemblies 168 are supported in the upper (+Z) rectangular portion of equipment support frame 14. Each electronic assembly 168 is mounted to the frame 14 by four bolts. The electro-optical equipment assembly 168 is mounted into the trapezoidal section of the frame 14 and is held in place by a stain-free arrangement of three slip-pins mounted through bushings which are molded in place on integral tabs on the frame members.

A back-up frame 166, shown in FIG. 6, attaches to and supports the equipment support frame 14. This back-up frame 166 provides necessary support to produce sufficient stiffness in the equipment support frame 14 and makes the truss system 152 determinant.

Figure 2:
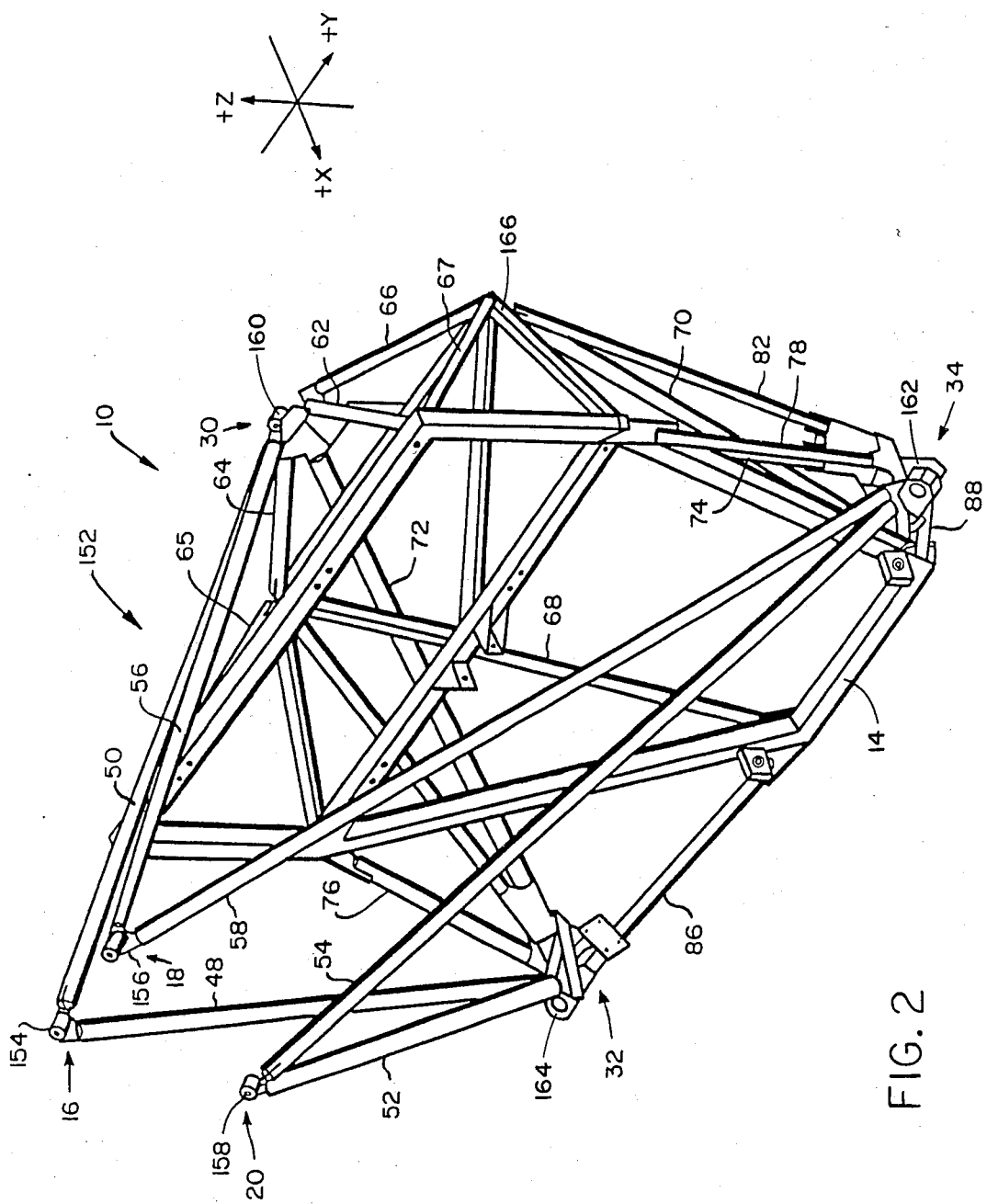
FIG. 2 is a perspective view of the present invention, the equipment support assembly.

As seen in FIG. 2, the equipment support frame 14 and back-up frame 166 are attached to each other and to the spacecraft by a network of truss tubes: 60, 62, 64, 65, 66, 67, 68, 70, 76, 78, 86 and 88. The back-up frame 166 is connected to the equipment support frame 14 by a bond/pin joint at its outboard end (+X) in three places, joints 44, 45, and 46, and is supported on its inboard end (—X) in two places, joints 47 and 49, by truss tubes 65, 67, 68 and 70 that attach to the top and bottom respectively of the equipment support frame 14. The frame/truss tube joints on the back-up frame have integrally woven composite blades, as indicated in FIG. 6. The termination of these truss tubes 65, 67, 68 and 70 at the top and bottom corners of the equipment support frame 14 is accomplished by use of small titanium blade joint fittings which fit into the back side (—X) of the equipment support frame 14, see FIG. 5. Together, the equipment support frame 14, the back-up frame 166, and the four truss tubes 65, 67, 68 and 70 form an equipment support assembly 15.

The equipment support assembly 15 is attached to the LCS attach fittings 160, 162, and 164 by another network of truss tubes. As shown in FIG. 2, four truss tubes 60, 62, 64, and 66 connect the equipment support assembly 15 to attach fitting 160. Two tubes 64 and 66 connect attach fitting 160 to the inboard (—X) end of the back-up frame 166 while the other two tubes 60 and 62 connect it with the top end (+Z) of the equipment support frame 14. Attach fitting 162 is connected to the equipment support assembly 15 by three truss tubes 78, 82, and 88. The tubes 78, 82, and 88 connect the attach fitting 162 to the tabs on joint 38 (+Y, —Z) of the equipment support frame 14, the joint 28 (+Y) of the equipment support frame 14, and the joint 42 (—X, +Y) of the back-up frame 166 respectively. The connection of attach fitting 164 to the equipment support assembly 15 is similar to that of attachment 162 by symmetry.

Figure 3:
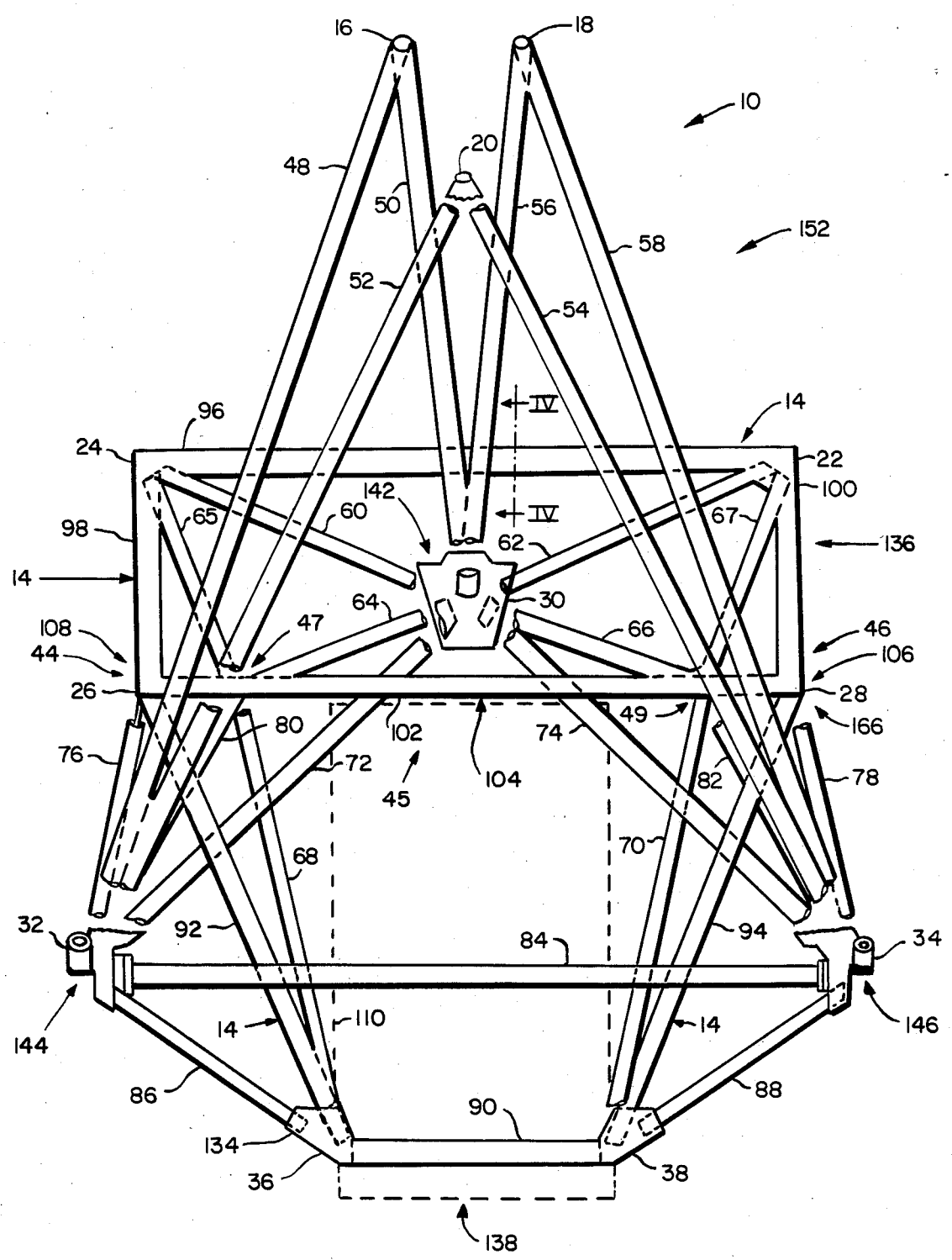
FIG. 3 is a front view of the assembly (looking —X).
Figure 4:
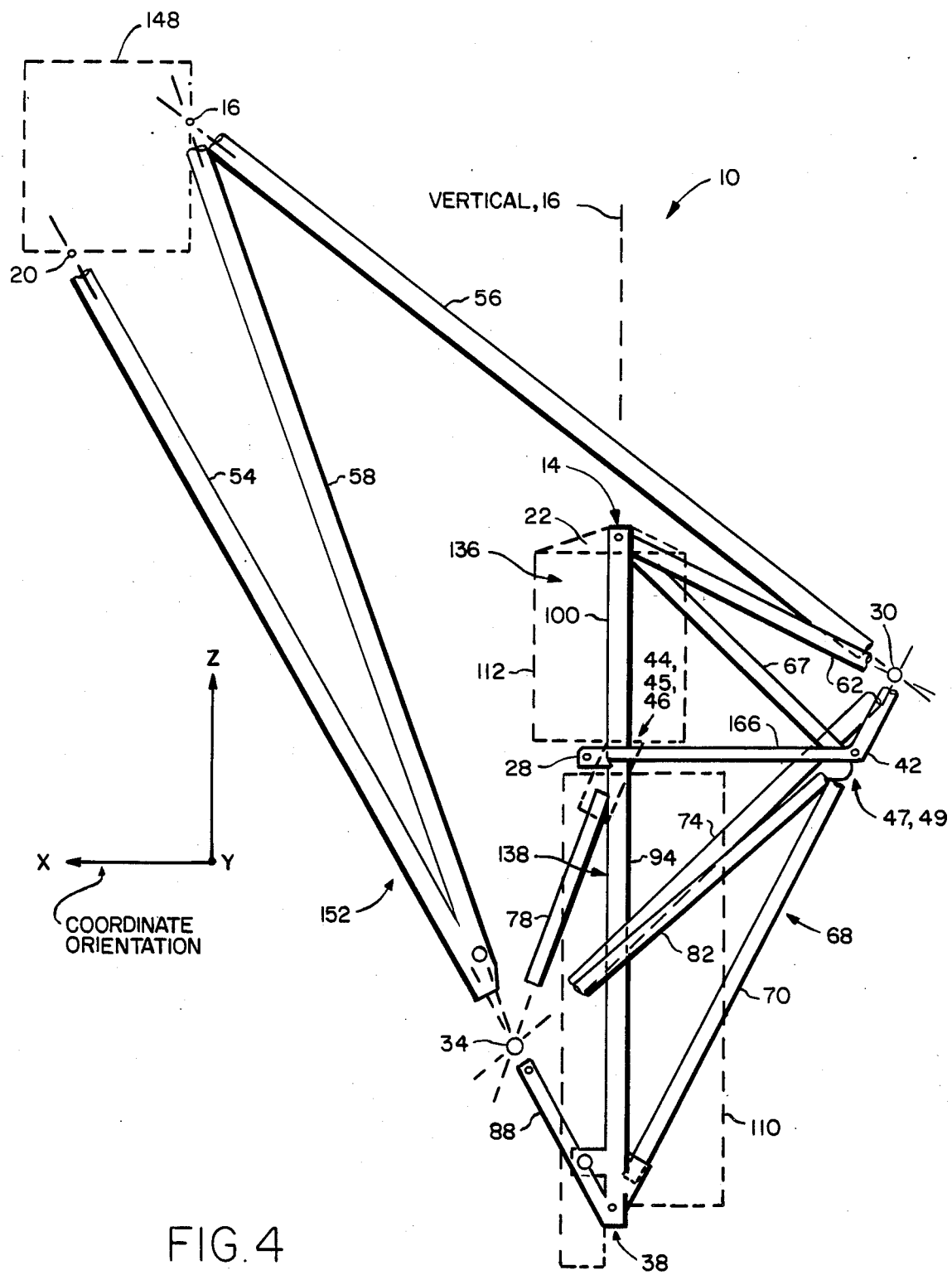
FIG. 4 is a side view of the assembly (looking —Y).

Referring to FIG. 3, this is a view taken in the (−X) direction of FIG. 1. FIG. 4 is a side view taken of structural system 10 in the (−Y) direction of FIG. 1 or shows a view of structural system 10 of FIG. 3 when rotated 90 degrees clockwise about a vertical 16 being parallel to an equipment frame 14, shown in FIG. 4.

In FIG. 3, each joint is defined as the meeting of two or more tubes or frame members and/or one or more of each. The manner of forming the fittings in these joints 16 to 49 will be detailed hereinbelow.

In order to further aid in explaining structural system 10, a plurality of tubes 48 to 88 and frame members 90 to 108 are identified.

The XYZ coordinatae system is centered on joint 30 and has the orientation as shown in FIGS. 1 and 4. As a result of the above, Table I provides the coordinates of each joint:

TABLE I

| JOINT | X (in.) | Y (in.) | Z (in.) |
|---|---|---|---|
| 16 | 36.73 | −3.031 | 28.05 |
| 18 | 36.73 | 3.031 | 28.05 |
| 20 | 42.68 | 0 | 21.05 |
| 22 | 14.312 | 16.025 | 7.05 |
| 24 | 14.312 | −16.025 | 7.05 |
| 26 | 14.312 | −16.025 | −4.45 |
| 28 | 14.312 | 16.025 | −4.45 |
| 30 | 0 | 0 | 0 |
| 32 | 19.311 | −19.542 | −19.2 |
| 34 | 19.311 | 19.542 | −19.2 |
| 36 | 14.312 | −6.637 | −27.95 |
| 38 | 14.312 | 6.6375 | −27.95 |
| 40 | 2.58 | −16.025 | −4.45 |
| 42 | 2.58 | 16.025 | −4.45 |
| 44 | 14.312 | −11.439 | −4.45 |
| 46 | 14.312 | +11.439 | −4.45 |

Between each joint where there is a tube therein the following table defines other parameters in the construction of structural system 10:

TABLE II

| TUBE NO. | TUBE TRUE LENGTH (in.) BETWEEN NODES | TUBE LENGTH | TUBE DIA. |
|---|---|---|---|
| 50 | 46.315 | 35.84 | 1.00 |
| 48 | 52.996 | 45.28 | 1.00 |
| 52 | 50.478 | 43.46 | 1.00 |
| 72 | 33.518 | 26.45 | 1.00 |
| 64 | 12.542 | 8.86 | .75 |
| 60 | 22.613 | 18.01 | .75 |
| 65 | 17.057 | 14.33 | .75 |
| 68 | 26.701 | 23.00 | .75 |
| 80 | 23.731 | 18.28 | .75 |
| 76 | 15.966 | 10.77 | .75 |
| 86 | 16.374 | 12.66 | .75 |
| 84 | 39.084 | 33.24 | 1.00 |
| 56 | 46.315 | 35.84 | 1.00 |
| 58 | 52.996 | 45.28 | 1.00 |
| 54 | 50.478 | 43.46 | 1.00 |
| 74 | 33.518 | 26.45 | 1.00 |
| 66 | 12.542 | 8.86 | .75 |
| 62 | 22.613 | 18.01 | .75 |
| 67 | 17.057 | 14.33 | .75 |
| 70 | 26.701 | 23.60 | .75 |
| 82 | 23.731 | 18.28 | .75 |
| 78 | 15.966 | 10.77 | .75 |
| 88 | 16.174 | 12.66 | .75 |

Equipment support frame 14 as seen in FIGS. 2, 3, 4, and 5A has a rectangular shaped top section 136, a trapezoidal shaped bottom section 138, and a trapezoidal shaped back-up frame 166 connected between top section 136 and bottom section 138, and is further perpendicular thereto. Top section 136 has frame members 98, 96, and 100. Bottom section 138 has frame members 90, 92, 94 and 102. Back-up frame 166, FIG. 6A, has frame members 104, 106 and 108.

The three LCS attach fittings 160, 162 and 164, FIG. 2, accomplish three objectives: (1) serve as termination points for the truss tube networks, (2) provide a determinate mounting to the spacecraft and, (3) provide adjustment capability for the installation and alignment of the structural system 10 into the spacecraft.

Figure 7B:
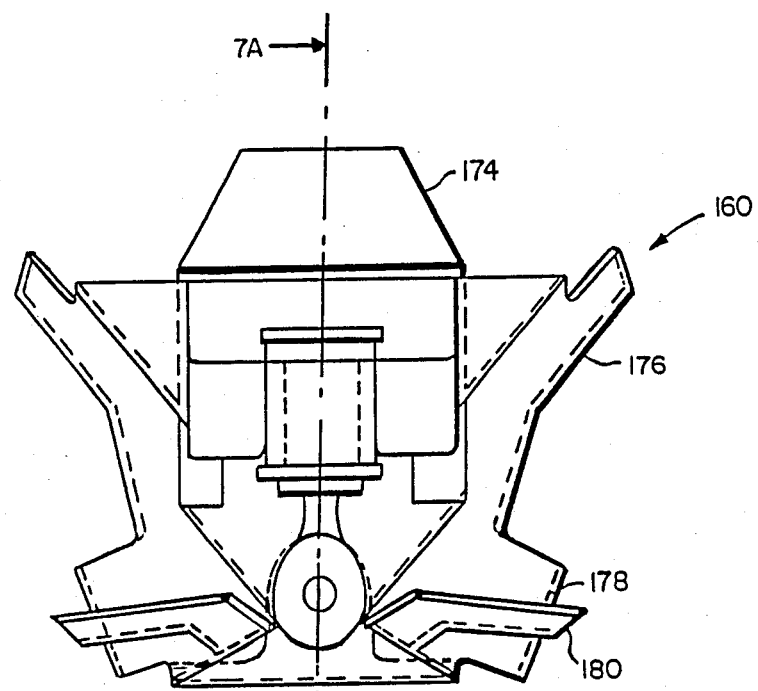
FIGS. 7A and 7B are views of one attach fitting.
Figure 7A:
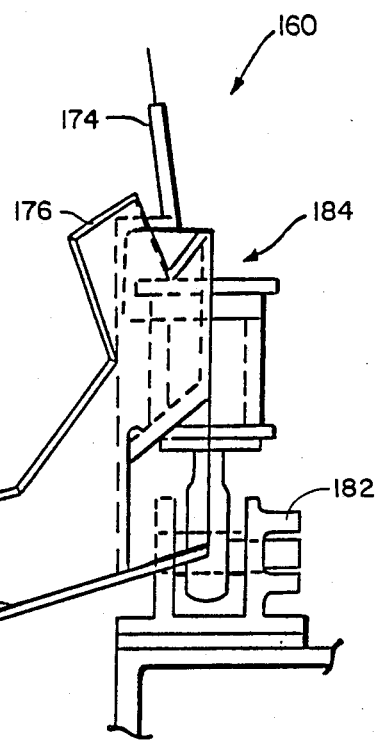
Figure 8:
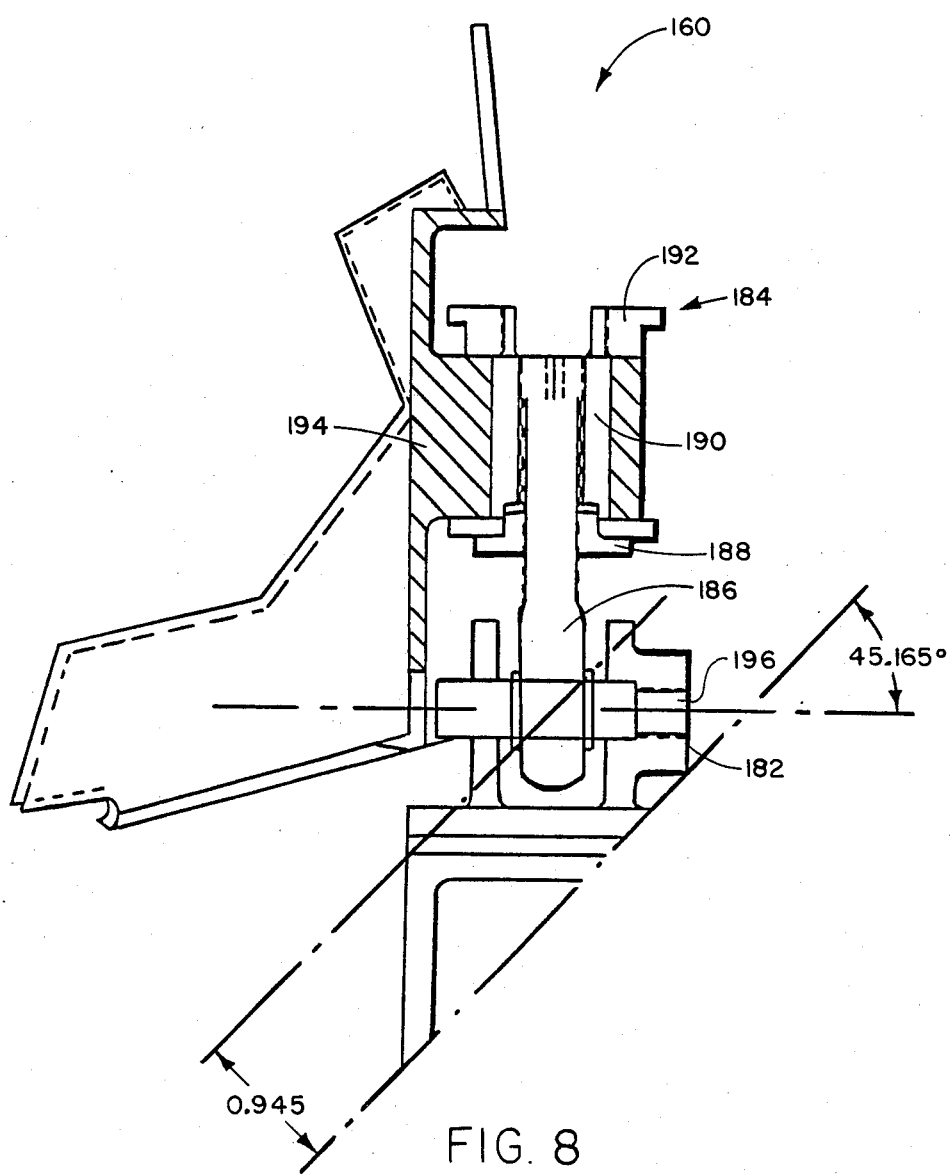
FIG. 8 is a section view of the LCS alignment/adjustment provisions in the attach fitting of FIG. 7.

Attach fitting 160 is depicted in FIGS. 7A, 7B and 8. It is typical of all three attach fittings in function and construction. The attach fittings are constructed of titanium (6AL-4V) weldments. Each has a pan 172 with welded sides that extend out radially forming blades such as blades 174, 176, 178, and 180 onto which the truss tubes are connected by bonding. Each attach fitting also has a lug 182 attached which has provisions for a threaded adjustment assembly 184. The adjustment assembly 184 pictured in FIG. 8 is a rotatable sleeve assembly containing a rod 186 having a bearing on one end and threads on the other, a locknut 188, a threaded sleeve 190, and a lock sleeve 192 in a body 194 of attach fittings 160. Adjustment is achieved by loosening the locknut 188 and rotating the sleeve 190 while the rod 186 is engaged on the spacecraft attachment pin 196. Rotation of the sleeve 190 causes the entire fitting 162 (and hence the LCS) to move up or down the threaded portion of the rod 186 thus providing installation alignment of +/−0.200 degrees from nominal of the LCS to the spacecraft at a rate of +/−0.004 degrees/revolution of the adjustment nut. This adjustment is made after the LCS is firmly attached to the spacecraft.

Figure 9:
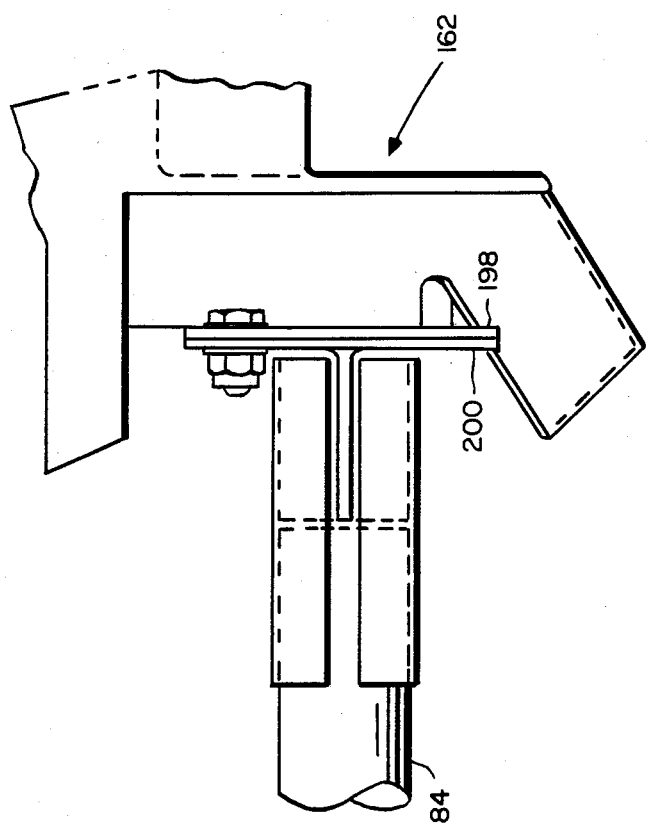
FIG. 9 is a view of a removable strut attachment.

As noted above, the attach fittings 160, 162, and 164 provide blades to which truss tubes are attached. These truss tubes 48, 50, 52, 54, 56, 58, etc. support the GTA and the equipment support assembly 15. There are also three tubes 72, 74, and 84 which connect the three LCS attach fittings 160, 162, and 164 to one another. These three tubes 72, 74, and 84 are required to maintain the relative locations of the LCS attach fittings 160, 162, and 164 with regard to each other. However, because of the size and shape of some of the optical components, it is necessary for the truss tube connecting LCS attach fittings 162 and 164 to be removable to facilitate the installation of the optical equipment. This requires the slight modification of the truss tube termination as shown in FIG. 9. Instead of this tube terminating on the blade of LCS attach fittings 162 and 164, these fittings provide flanges such as flange 198 which mate with flanges such as flange 200 on the terminations of the removable truss tube 84 (removable strut). This allows the removal and replacement of a truss tube 84 without degradation of the structural performance or thermal stability of the structural system 14.

Figure 10A:
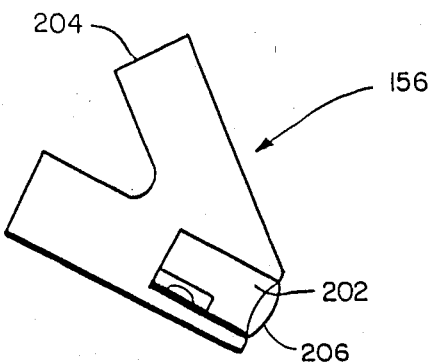
FIGS. 10A and 10B are views of the GTA attach fittings.
Figure 10B:
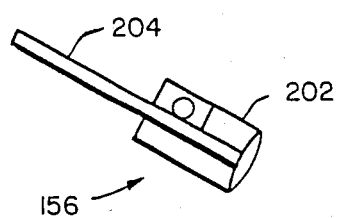

A typical GTA attach fitting such as fitting 156 is shown in FIG. 10. Three of these fittings support and locate the GTA 148 relative to the other LCS components as illustrated by FIG. 1. Each GTA attach fitting is a titanium weldment consisting of a cylinder 202 welded to a flat blade 204. The cylinder 202 has a threaded hole 206 along its longitudinal axis which is accurately located relative to the end of the cylinder which represents the GTA mounting surface. This taped hole 206 accommodates a precision shoulder bolt which attaches ands orients the GTA. Another tapped hole in the transverse axis of the cylinder serves to support a ground support equipment (GSE) frame. The orientation of the cylinder 202 relative to the blade 204 is dependant upon the location of the GTA attach fitting such as 154, 156, and 158 relative to the LCS attach fittings 160, 162, and 164 to which the GRA support truss members are attached. The GTA attach fitting blade such as 204 is oriented in the plane of the centerlines of the two GTA support truss tubes such as 56 and 58 to which it is attached.

Because of the high stiffness and low thermal expansion requirements placed upon the truss tube members, they are fabricated from high modules graphite/epoxy lay-ups. The material used in HMS/934 unidirectional prepeg graphite epoxy. The laminate fabric used (0,60,0,−60,0) has a near zero coefficient of thermal expansion (less than 0.000001 inch/inch/degree F) and a high modulus in the axial direction. The GTA truss tubes utilize 10 ply 1.062 inch outer diameter tubes while the other truss tubes may be either 5 or 10 ply tubes and either 0.812 inch or 1.062 inch in outer diameter depending on local loading.

Figure 11:
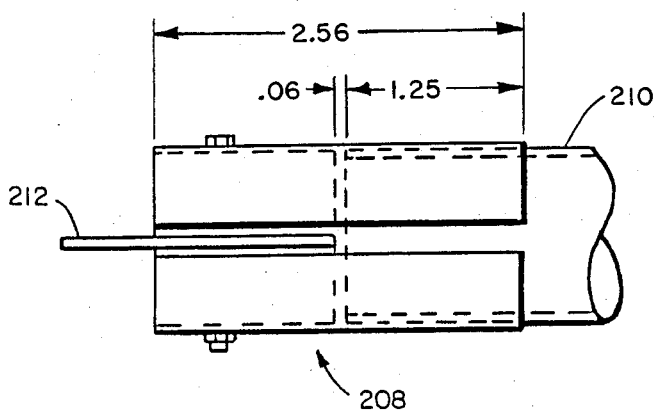
FIGS. 11 and 12 are illustrations of the specialized truss tube termination assembly process.
Figure 12:
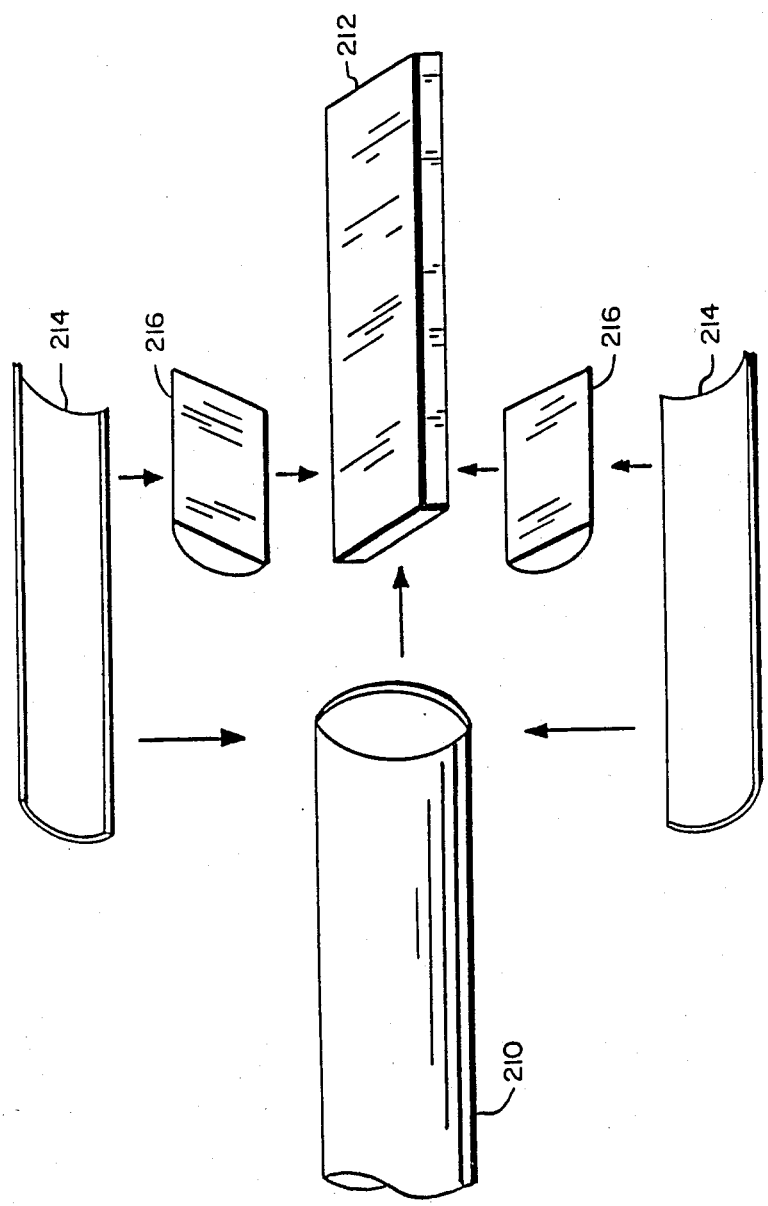

A typical truss tube termination 208 is shown in FIG. 11. Each tube 210 terminates at a blade 212 which is attached to a fitting, not shown. As shown in FIG. 12, the truss tube 210 attachments to a pair of shells 214 which are bonded to the truss tube 210 and plugs 216 which are bonded to the blade 212 of the fitting as indicated in FIG. 11. All of the components of the joint are graphite/epoxy except for the blade which may be either graphite/epoxy or titanium.

As can be seen from the description of the joint pictured in FIGS. 11 and 12, this joint technique requires close tolerance control on the various components to produce a tight joint. The plugs 216 require a controlled outer diameter (O.D.), the split shells 214 require a controlled inner diameter (I.D.) and the truss tubes 210 require an accurately controlled O.D. for the joint and a moderately controlled I.D. for weight control. Thus, a method for producing a truss tube with both controlled I.D. and O.D. is required.

As for the equipment support frame 14 and the backup frame 166 shown in FIGS. 3 and 4 respectively, these require high stiffness, relatively low thermal expansion, and good bearing properties since they support electronic and optical equipment assemblies 168. These characteristics are obtainable when the frames have long fiber reinforcement therein produced by a combination of planar stylus weaving and the transfer molding process.

One unique advantage of this combination is that tabs can be constructed projecting from the frame members that share continuous fiber reinforcement with the primary frame members. See FIGS. 6A and 6B for example. It should be noted that some of these tabs form integral blades for the attachment of truss tubes while other form mounting tabs for equipment. The mounting tabs may contain molded in-place bushings to carry local bearing loads and to provide accurate and repeatable alignment of the equipment. These bushings, as well as the truss tube tabs, are all located by the mold tooling, and produce accurate and consistent mounting locations from frame to frame.

The fabrication of the structural system 10 as a whole must insure the correct relative location and alignment of the optical components that are attached to it. To maintain that accuracy, no post assembly slip is allowed.

To accomplish this, an assembly technique utilizing high accuracy tooling was devised.

This assembly technique fixes (by means of a tooling fixture) the key locating points of the structural system 10 (GTA attach points, optical equipment attach points, LCS/spacecraft attach points, etc.). The associated structural component is then attached to the corresponding tooling point and given the proper orientation. This is done for all of the fittings and the equipment support frame assembly 15. Then the tubes are bonded in place between the corresponding fittings by the method described previously. A tooling fixture for holding structural system 10 is not shown. After the joints have cured, the LCS structural system 10 is them transferred to other support tooling for the installation of the electronic and optical components. This technique automatically compensates for tolerances and slight manufacturing flaws because it is made net to the proper tolerances based on the tooling fixture.

Clearly, many modifications and variations of the present invention are possible in light of the above teachings and it is therefore understood, that within the inventive scope of the inventive concept, the invention may be practiced otherwise than specifically claimed.

What is claimed is:

1. A structural system attached to a spacecraft at three attachment points, said structural system fixedly holding a plurality of equipment assemblies, said structural system comprising:

a truss system for fixedly holding a distal equipment assembly, said truss system having three traingular trusses, three joints being apexes, one from each of said trusses, are fixedly attached to said distal equipment assembly by truss tubes, one of said trusses having two base joints, each fixedly connected to one of lower attachment points of said spacecraft being oppositely positioned in said structural system; a second truss of said trusses having two base joints, one connected to one of said lower attachment points being oppositely positioned, the other of said base joints of said second truss connected to a central attachment point of said spacecraft; a third truss of said trusses having two base joints, one connected to the other of said lower attachment points being oppositely positioned, the other base joint of said third truss being attached to said central attachment point; said trusses being graphite-epoxy tubes fixedly attach to fittings of said trusses;

an equipment support assembly for fixedly holding equipment assemblies, said equipment support assembly having an equipment support frame and a backup frame, said frames having a plurality of frame members composed of graphite-epoxy composite material, said frame members having equipment and mounting tabs and blades mounted integrally thereon, said frames having selectively positioned mounting blades, said equipment support assembly having internal stiffing tubes being connected to said blades; and a plurality of equipment support assembly tubes for fixedly holding said support assembly to said attachment points, said support assembly tubes being composed of graphite-epoxy composite material, said tubes being fixedly connected to blades of said attachment points and of said frames whereby said structural system provides:

less than 500 microradians of total angular displacement of a line of sight under operational conditions;

less than 170 microradians of total angular displacement of said line of sight on-orbit; and less than 50 microradians per hour angular rate of change of said line of sight during on-orbit operations.

2. A structural system as defined in claim 1 wherein said equipment support assembly comprises:

a top support section;

a bottom support section;

and a supporting bridge section, said bridge section being perpendicular to said top and said bottom support sections; said top support section and said bottom support section jointed together by a common frame member, said top support section having two oppositely positioned support tubes being attached to said central attachment point; said top support section having two other oppositely positioned support tubes being attached to oppositely positioned lower attachment points; said bottom support section having two bases, one smaller than the other, a smaller of said bases having two support tubes fixedly mounted thereto and to said oppositely positioned lower attachment points; said bridge section having two oppositely positioned joints having fixedly attached thereon support tubes, each of said joints of said bridge section having support tubes oppositely attached to said top support section, oppositely attached to said central attachment point, oppositely attached joints of said smaller of said bases of said lower support section, and oppositely attached to said lower attachment points.

3. A structural system as defined in claim 2 wherein said tubes are bonded to blades, said tubes have two plug in each end of said tubes, said tubes and said plugs having a congruent slot therein for holding said blades, said blades being fixedly held in said tubes by half-cylindrical washers bolted about said tubes, said tubes, said plugs, and said washers being graphite epoxy, said tubes, plugs, washers, and blades being bonded together while said structural system is mounted in a tooling fixture.

4. A structural system as defined in claim 1 wherein each of said attach fittings comprises a metal body having a plurality of pans fixedly attached thereto, said pans having sides fixedly attached thereto, a plurality of blades being integral to each of said pans, said blades bonded to said truss tubes, and an adjustment assembly fixedly attached to said body, said adjustment assembly providing two-degrees of movement to said attach fitting, said adjustment assembly having a rod with a threaded end and a bearing end, said threaded end inserted into a lock nut, a sleeve, and a lock sleeve.

5. A structural system as defined in claim 1 wherein a removable truss tube is mounted between said lower attachment points, each of said lower attach fittings having a flange integral thereto, said removable truss tube having a flange mounted in each end, said flange of said lower attach fitting being connected to said flange of said removable truss tube.

6. A structural system as defined in claim 1 wherein said equipment support frame, said tabs on said equipment support frame, and said blades on said equipment support frames are integrally constructed with long fiber reinforcement.

7. A structural system as defined in claim 1 wherein said backup frame, said tabs on said backup frame, and said blades on said backup frame are integrally constructed with long fiber reinforcement.

* * * * *